United States Patent [19]

Alper et al.

[11] 4,297,832
[45] Nov. 3, 1981

[54] APPARATUS AND METHOD FOR MECHANICAL HARVESTING OF FRUIT

[75] Inventors: Yekutiel Alper, Rishon Le Zion; Itzhak Elkin, Rehovot; Itzhak Wolf, Herzliyah; Gabriel Mihai, Ramat-Hasharon; Aharon Antler, Tel-Aviv, all of Israel

[73] Assignee: State of Israel Ministry of Agriculture, Bet Dagan, Israel

[21] Appl. No.: 107,855

[22] Filed: Dec. 28, 1979

[51] Int. Cl.³ ............................................. A01D 46/00
[52] U.S. Cl. ................................... 56/328 R; 171/27; 56/14.5
[58] Field of Search .................... 56/328 R, 327, 14.5, 56/330, 331; 171/27

[56] References Cited

U.S. PATENT DOCUMENTS

| 2,940,528 | 6/1960 | Magnuson | 171/27 |
| 3,584,690 | 6/1971 | Taylor | 171/27 |
| 3,633,677 | 1/1972 | Walker | 171/27 |
| 4,141,203 | 2/1979 | Keillor | 56/328 R |

FOREIGN PATENT DOCUMENTS 120388 of 1959 U.S.S.R. ................................. 56/331

Primary Examiner—Robert A. Hafer
Attorney, Agent, or Firm—Cushman, Darby & Cushman

[57] ABSTRACT

Mechanical fruit harvesting apparatus comprising a cutter for separating the tree canopy from the trunk thereof; and a conveyor for engaging the fruit bearing portions and for vibrating them such that the fruit falls therefrom.

10 Claims, 2 Drawing Figures

APPARATUS AND METHOD FOR MECHANICAL HARVESTING OF FRUIT

FIELD OF THE INVENTION

The present invention relates to agricultural equipment and more particularly to mechanical fruit picking apparatus, as well as mechanical fruit picking methods.

BACKGROUND OF THE INVENTION

Although mechanization has been introduced in the harvesting of a large number of agricultural commodities, soft fruit, such as peaches, destined for the fresh market is nevertheless still picked by hand due to its extreme sensitivity to bruising.

Various attempts have been made to successfully harvest soft fruit, mainly by the shake and catch method of harvesting. In this method most damage to the fruit is caused by contact between the fruit and tree branches along its fall.

Extensive research and development efforts have been made in an attempt to reduce damage to fruit falling through a tree. A multi-level catching system is proposed in an article by Millier, W. F. et al entitled, "A tree fruit harvester with an insertable multilevel catching system" ASAE paper No. 72-651. American Society of Agricultural Engineers. St. Joseph Mo. It has also been proposed to pad the fruit or the branches during harvesting or to fill the tree space with light-weight, impact absorbing particles during shaking.

None of the above proposals has been found acceptable for commercial implementation due to problems of pollution, toxicity and operational difficulties.

SUMMARY OF THE INVENTION

The present invention seeks to provide a fruit harvesting method and apparatus which overcomes the above deficiencies and which does not produce bruising of fruit beyond acceptable limits.

There is thus provided in accordance with the invention mechanical fruit harvesting apparatus comprising a cutter for separating the tree canopy from the trunk thereof; and a conveyor for engaging the fruit bearing portions and for vibrating them such that the fruit falls therefrom.

Further in accordance with the invention there is also provided a fruit conveyor disposed under the separation conveyor for receiving the falling fruit and conveying it to a storage or utilization location.

Additionally in accordance with an embodiment of the invention there is provided a method for harvesting fruit comprising the steps of separating the fruit bearing portion of the tree from the trunk thereof and subjecting the fruit bearing portion of the tree to vibration so as to cause the fruit to separate therefrom.

BRIEF DESCRIPTION OF THE DRAWINGS

The invention will be more fully understood and appreciated from the following detailed description taken in conjunction with the drawings in which.

DETAILED DESCRIPTION OF A PREFERRED EMBODIMENT

Figure 1:
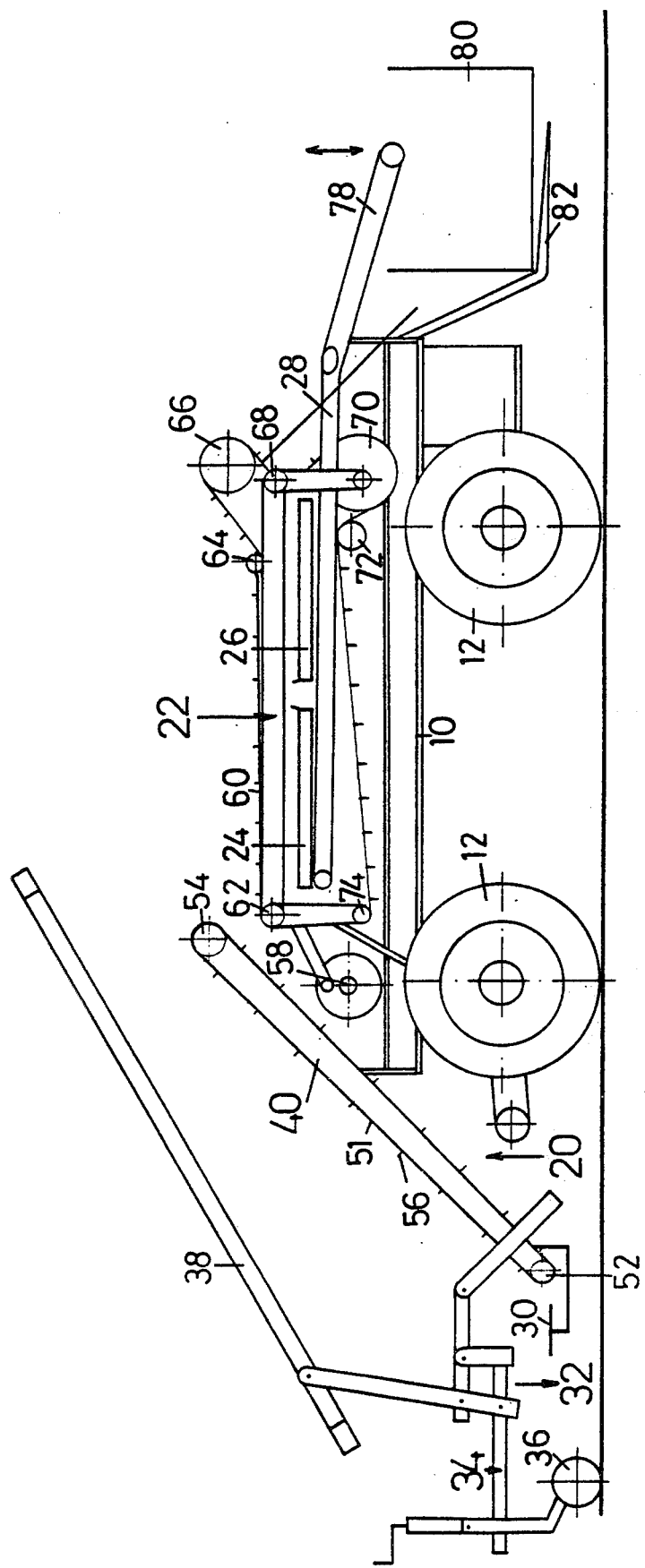
FIG. 1 is a schematic side view illustration of harvesting apparatus constructed and operative in accordance with an embodiment of the present invention.
Figure 2:
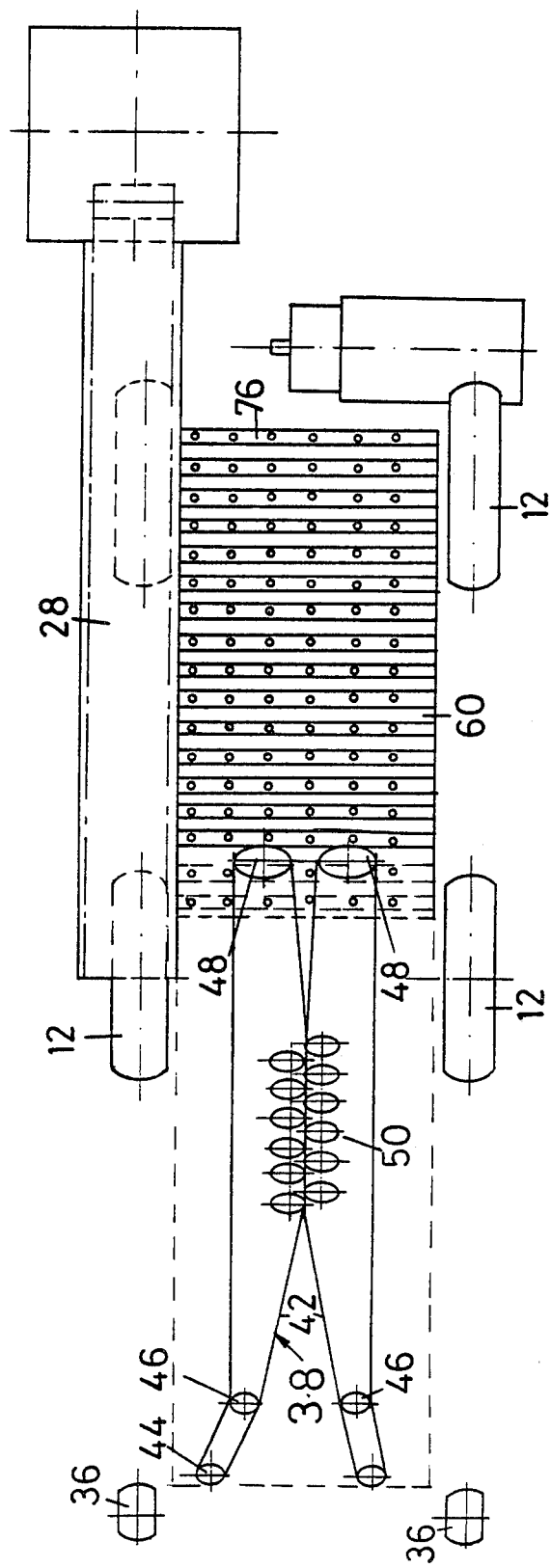
FIG. 2 is a schematic top view illustration of the harvesting apparatus of FIG. 1.

Reference is now made to FIGS. 1 and 2 which illustrate mechanical harvesting apparatus constructed and operative in accordance with an embodiment of the present invention, and comprising a chassis 10 mounted on four tires 12. Power for the harvesting apparatus is provided by a diesel engine mounted on the chassis and which is mechanically coupled as by a differential (not shown) to one or both pairs of tires 12 for providing locomotion.

The harvesting apparatus comprises a front end portion, indicated generally by reference numeral 20 and whose function is to separate tree foilage from the trunk and to load the fruit-bearing foilage onto the harvester. The remainder of the harvesting apparatus comprises a vibratory conveyor device 22, fruit off-loading conveyors 24 and 26 and sorting belt 28.

Considering first and front end portion, there is provided a circular saw, (or sickle for small trees) disposed generally in the horizontal plane, for cutting the foilage from tree trunks. Saw 30 is driven by chain or belt means from a suitable power source (not shown) and is mounting on a front end mounting chassis 32 whose height is selectably adjustable as by a crank and wheel assembly 34, typically comprising a pair of support wheels 36.

Also mounted on front end mounting chassis 32 is an overhead squeeze conveyor assembly 38 for engaging the top portions of the tree foilage before they fall and carrying them gently onto the harvesting apparatus in cooperation with a lower belt conveyor 40, which is also partially mounted onto chassis 32.

The overhead squeeze conveyor assembly 38 comprises a pair of narrow endless belts 42, each mounted on a plurality of rollers 44, 46 and 48. The belts are spread apart at their front facing ends adjacent rollers 44 so as to receive the tree foilage as it is being cut from the trunk by saw 30. Belts 42 are urged together by a series of oppositely disposed interspersed squeeze rollers 50, for secure engagement of the foilage as it is being lifted onto the lower conveyor 40. Following the squeeze rollers 50, the belts 42 separate, thus releasing the foilage and allowing it to fall gently onto the vibrating conveyor 22.

It may be appreciated that the purpose of the overhead conveyor assembly is to provide extremely gentle handling of the foilage and the fruit contained therein, so as to prevent bruising thereof.

Lower conveyor 40 is a relatively wide belt conveyor of conventional construction and comprises a belt 51 mounted on rollers 52 and 54. Belt 51 is formed with spaced upstanding elements 56 for preventing rolling or sliding of foilage or fruit down the incline defined by the belt.

Belt 51 and 35 together feed the foilage onto vibratory sorter 22, which is typically driven by an eccentric drive 58 and also comprises a moving conveyor web 60. Web 60 is typically formed of a multiplicity of spaced rods arranged in parallel disposition such that sufficient space is defined between the rods to permit fruit to fall therebetween. Web 60 is typically subjected to vibration of amplitude 10 cm and frequency in the range of 125–145 rpm.

Conveyor web 60 is mounted on a plurality of rollers 62, 64, 66, 68, 70, 72 and 74 and is driven by suitable driving means (not shown). It is noted that all of the conveyor apparatus employed in the harvester may be conveniently driven by the central power source of the harvester, by suitable power transmission means, or alternatively by individual power sources such as hydraulic motors.

It is a particular feature of the invention that the foilage is vibrated on the vibrating sorter 22 along a longitudinal axis 76, along which the branches of the foilage are generally aligned. It has been found that vibration along this axis provides enhanced fruit disengagement efficiency.

Fruit falling from the vibrating sorter 22 is received on a pair of conveyor belts 24 and 26 which move the fruit to one side of the harvester and onto the sorting conveyor 28, disposed on one side of the harvester. Conveyor 28 is provided with a selectable height discharge portion 78 which feeds the fruit into a container 80 which may be retained on forks 82 attached to the harvester. The selectable height discharge portion enables the drop height of the fruit to be maintained quite small to prevent bruising of the fruit.

It will be appreciated by persons skilled in the art that the invention is not limited to what has been specifically shown and described hereinabove. Rather the scope of the invention is defined only by the claims which follow:

We claim:

1. Mechanical fruit harvesting apparatus comprising:
   cutter means for cutting fruit bearing portions of a tree from the trunk thereof;
   separation conveyor means for engaging and vibrating said fruit bearing portions after cutting thereof so as to cause fruit to separate therefrom; and
   feeding conveyor means for engaging said fruit bearing portions and bringing them into engagement with said separation conveyor means and including:
   a first conveyor belt; and
   a pair of cooperating second conveyor belts for engaging the upper parts of said fruit bearing portions between themselves, said first and second conveyor belts moving together in synchronous motion.

2. Harvesting apparatus according to claim 1 and also comprising a fruit conveyor disposed under said separation conveyor means for receiving said falling fruit and conveying it to a storage or utilization location.

3. Harvesting apparatus according to claim 1 and wherein said separation conveyor means comprises shaking means.

4. Harvesting apparatus according to claim 1 and wherein said first conveyor means is formed with upstanding flaps.

5. Harvesting apparatus according to claim 3 and wherein said shaking means is operative to vibrate with an amplitude of approximately 10 cm.

6. Harvesting apparatus according to claim 5 and wherein said shaking means is operative to vibrate with a frequency in the range of 100–200 rpm.

7. Harvesting apparatus according to claim 2 and also comprising side conveyor means for receiving fruit from said fruit conveyor.

8. Harvesting apparatus according to claim 3 and wherein said shaking means is constructed to comprise a multiplicity of spaced bars, the spacing being sufficient to permit separated fruit to fall therethrough.

9. A method for harvesting tree fruit comprising the steps of:
   cutting the fruit bearing portion of a tree from the trunk thereof;
   engaging the upper parts of said fruit bearing portion by a pair of overhead cooperating conveyor belts;
   engaging the lower parts of said fruit bearing portion by a feeding conveyor belt operating synchronously with the overhead conveyor belts;
   supporting said fruit bearing portion on said feeding conveyor belt as it is disengaged from said overhead conveyor belts;
   operating said feeding conveyor belt to supply said fruit bearing portion to separation conveyor means; and
   operating said separation conveyor means for vibrating the fruit bearing portion of the tree after cutting thereof so as to cause the fruit to separate therefrom.

10. Mechanical fruit harvesting apparatus comprising:
    cutter means for separating fruit bearing portions of a tree from the trunk thereof;
    feeding conveyor means for engaging said separated fruit bearing portions and including a first conveyor belt and a pair of cooperating second conveyor belts for engaging the upper parts of said fruit bearing portions, said first and second conveyor belts moving together in synchronous motion;
    separation conveyor means receiving said separated fruit bearing portions from said feeding conveyor means and comprising a shaking conveyor operative for vibration generally along the main axis of branches of said fruit bearing portions, said shaking conveyor defining spaces between the elements thereof of sufficient size to permit separated fruit to fall therethrough; and
    a fruit conveyor disposed under said separation conveyor means for receiving said falling fruit and conveying it to a storage or utilization location.

* * * * *